US008010113B2

(12) United States Patent
Black

(10) Patent No.: US 8,010,113 B2
(45) Date of Patent: *Aug. 30, 2011

(54) METHOD AND APPARATUS FOR PERFORMING HANDOFF IN COMMUNICATION SYSTEMS

(75) Inventor: Peter John Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 12/543,078

(22) Filed: Aug. 18, 2009

(65) Prior Publication Data

US 2009/0305705 A1    Dec. 10, 2009

Related U.S. Application Data

(63) Continuation of application No. 11/668,618, filed on Jan. 30, 2007, now Pat. No. 7,580,709, which is a continuation of application No. 09/434,314, filed on Nov. 4, 1999, now Pat. No. 7,206,580.

(51) Int. Cl.
*H04Q 7/20* (2006.01)
(52) U.S. Cl. ........ 455/437; 455/439; 455/69; 455/452.2
(58) Field of Classification Search .................. 455/525, 455/522, 69, 437, 442, 452.2, 436, 453.2, 455/439, 517, 67.13, 67.11, 552.1
See application file for complete search history.

(56) References Cited

U.S. PATENT DOCUMENTS

| | | | |
|---|---|---|---|
| 4,222,115 A | 9/1980 | Cooper et al. |
| 4,475,010 A | 10/1984 | Huensch et al. |
| 4,718,081 A | 1/1988 | Brenig |
| 4,901,307 A | 2/1990 | Gilhousen et al. |
| 5,054,110 A | 10/1991 | Comroe et al. |
| 5,056,109 A | 10/1991 | Gilhousen et al. |
| 5,101,501 A | 3/1992 | Gilhousen et al. |
| 5,103,459 A | 4/1992 | Gilhousen et al. |
| 5,109,390 A | 4/1992 | Gilhousen et al. |
| 5,109,528 A | 4/1992 | Uddenfeldt |
| 5,127,100 A | 6/1992 | D'Amico et al. |
| 5,179,571 A | 1/1993 | Schilling |

(Continued)

FOREIGN PATENT DOCUMENTS

EP    0671819    9/1995

(Continued)

OTHER PUBLICATIONS

International Search Report—PCT/US00/030580—International Search Authority—EPO—May 15, 2001.

(Continued)

*Primary Examiner* — John J Lee
(74) *Attorney, Agent, or Firm* — Kam T. Tam; Darren M. Simon

(57) ABSTRACT

A communication system including a closed loop power control system. Prior to allowing a handoff to a new base station, the subscriber station verifies that its reverse link signal is being received by the destination base station with sufficient energy. The determination is made based on the received reverse link power control commands from the base station. Moreover, a handoff may be forced when the base station providing the best forward link signal in not receiving the reverse link signal from the subscriber station with sufficient energy.

20 Claims, 6 Drawing Sheets

U.S. PATENT DOCUMENTS

| | | | |
|---|---|---|---|
| 5,267,261 A | | 11/1993 | Blakeney et al. |
| 5,327,577 A | | 7/1994 | Uddenfeldt |
| 5,345,467 A | * | 9/1994 | Lomp et al. .................... 370/331 |
| 5,487,174 A | * | 1/1996 | Persson ......................... 455/525 |
| 5,491,717 A | | 2/1996 | Hall |
| 5,722,044 A | | 2/1998 | Padovani et al. |
| 5,774,809 A | | 6/1998 | Tuutijarvi et al. |
| 5,864,760 A | | 1/1999 | Gilhousen et al. |
| 5,884,176 A | | 3/1999 | Vaara |
| 5,933,462 A | | 8/1999 | Viterbi et al. |
| 5,933,787 A | | 8/1999 | Gilhousen et al. |
| 5,940,761 A | | 8/1999 | Tiedemann et al. |
| 6,026,081 A | | 2/2000 | Hamabe et al. |
| 6,038,448 A | | 3/2000 | Chheda et al. |
| 6,055,428 A | | 4/2000 | Soliman |
| 6,088,335 A | | 7/2000 | I et al. |
| 6,104,927 A | | 8/2000 | Willey |
| 6,119,010 A | | 9/2000 | Labedz |
| 6,144,861 A | | 11/2000 | Sundelin et al. |
| 6,154,652 A | | 11/2000 | Park |
| 6,154,653 A | | 11/2000 | Jung |
| 6,157,668 A | | 12/2000 | Gilhousen et al. |
| 6,175,736 B1 | | 1/2001 | Lee |
| 6,208,873 B1 | | 3/2001 | Black et al. |
| 6,321,089 B1 | | 11/2001 | Han |
| 6,324,401 B1 | | 11/2001 | De HozGarcia-Bellido et al. |
| 6,337,984 B1 | | 1/2002 | Hong et al. |
| 6,341,124 B1 | | 1/2002 | Johansson et al. |
| 6,351,651 B1 | | 2/2002 | Hamabe et al. |
| 6,487,191 B1 | | 11/2002 | Kang et al. |
| 6,515,975 B1 | | 2/2003 | Chheda et al. |
| 6,526,028 B1 | | 2/2003 | Kondo |
| 6,574,211 B2 | | 6/2003 | Padovani et al. |
| 6,577,868 B1 | | 6/2003 | Vialen et al. |
| 6,580,745 B1 | | 6/2003 | Kondo |
| 6,731,949 B2 | | 5/2004 | Hamabe et al. |
| 6,985,511 B2 | | 1/2006 | Kanterakis et al. |
| 7,072,311 B1 | | 7/2006 | Czaja et al. |
| 7,499,701 B2 | | 3/2009 | Salonaho et al. |
| 7,580,709 B2 | | 8/2009 | Black |

FOREIGN PATENT DOCUMENTS

| | | |
|---|---|---|
| EP | 0680160 | 11/1995 |
| EP | 1032237 | 8/2000 |
| WO | WO9319537 | 9/1993 |
| WO | WO9943177 | 8/1999 |
| WO | WO0001185 | 1/2000 |
| WO | WO0101720 | 1/2001 |

OTHER PUBLICATIONS

International Report on Patentability—PCT/US00/030580—IPEA/US—Dec. 10, 2001.

European Search Report—EP07115321—Search Authority—Munich Patent Office—Sep. 26, 2007.

* cited by examiner

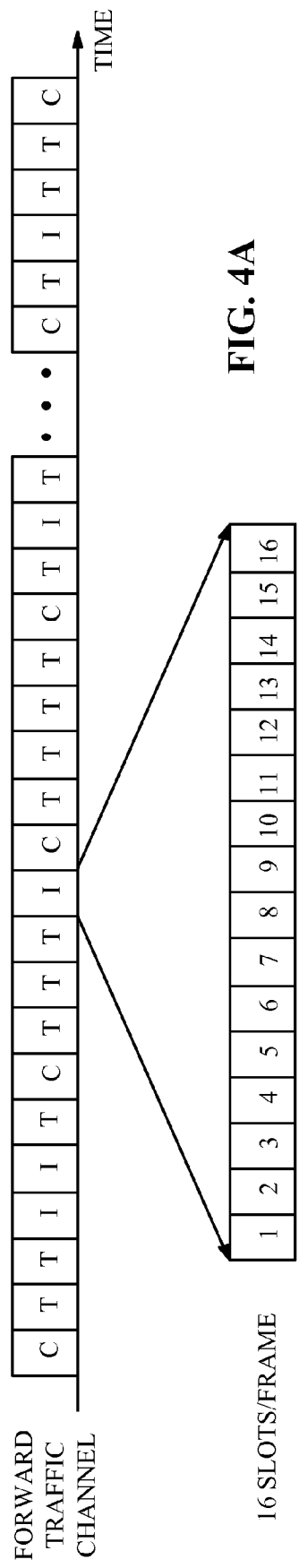
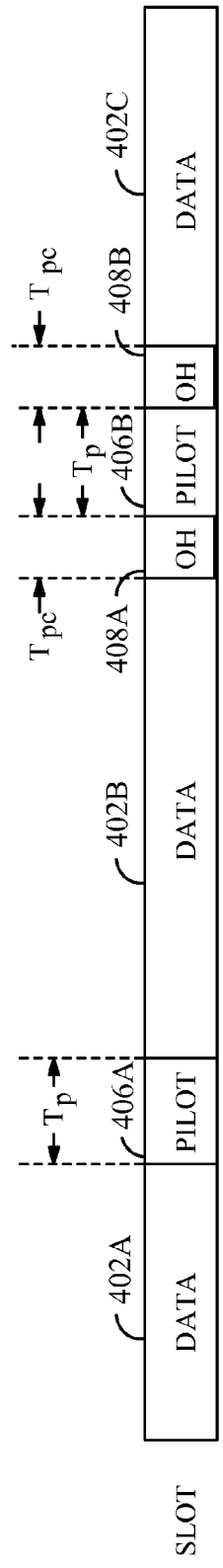
FIG. 4A
FIG. 4B

METHOD AND APPARATUS FOR PERFORMING HANDOFF IN COMMUNICATION SYSTEMS

The present application for patent is a continuation of and claims priority to U.S. patent application Ser. No. 11/668,618 ("the '618 application"), titled "METHOD AND APPARATUS FOR PERFORMING HANDOFF IN A HIGH SPEED COMMUNICATION SYSTEM," filed Jan. 30, 2007, now allowed. The '618 application is a continuation of and claims priority to U.S. patent application Ser. No. 09/434,314 ("the '314 application"), titled "METHOD AND APPARATUS FOR PERFORMING HANDOFF IN A HIGH SPEED COMMUNICATION SYSTEM," filed Nov. 4, 1999, now U.S. Pat. No. 7,206,580. Both the '618 application and the '314 application are assigned to the assignee of the present application, and are expressly incorporated by reference herein.

BACKGROUND OF THE INVENTION

1. Field of the Invention

The present invention relates to wireless communications. More particularly, the present invention relates to a novel and improved method and apparatus for performing handoff in a wireless communication system.

2. Description of the Related Art

It has become very important for service providers to be able to provide high speed wireless services to their customers. A high speed wireless communication system is disclosed in U.S. Pat. No. 6,574,211, (the '211 patent), issued Jun. 3, 2003, entitled, "METHOD AND APPARATUS FOR HIGHER RATE PACKET DATA TRANSMISSION," which is assigned to the assignee of the present invention and incorporated by reference herein. In the '211 patent, the base station transmits to subscriber stations by sending frames that include a pilot burst time multiplexed in to the frame and transmitted at a rate based on channel information transmitted from the subscriber station to the base station. This system is optimized for the wireless transmission of digital data.

Code Division Multiple Access or CDMA has proven itself to be the predominant choice for wireless service providers because of its high spectral efficiency. One such CDMA communication system is described in the "TIA/EIA/IS-95 Subscriber station-Base Station Compatibility Standard for Dual-Mode Wideband Spread Spectrum Cellular System," hereinafter referred to as the IS-95 standard. The IS-95 CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated by reference herein.

In this specification, base station refers to the hardware with which the subscriber stations communicate. Cell refers to the hardware or the geographic coverage area, depending on the context in which the term is used. A sector is a partition of a cell. Because a sector of a CDMA system has the attributes of a cell, the teachings described in terms of cells are readily extended to sectors.

In the CDMA system, communications between users are conducted through one or more base stations. A first user on one subscriber station communicates to a second user on a second subscriber station by transmitting data on the reverse link to a base station. The base station receives the data and can route the data to another base station. The data is transmitted on the forward link of the same base station, or a second base station, to the second subscriber station. The forward link refers to transmission from the base station to a subscriber station and the reverse link refers to transmission from the subscriber station to a base station. In IS-95 systems, the forward link and the reverse link are allocated separate frequencies.

The subscriber station communicates with at least one base station during a communication. CDMA subscriber stations are capable of communicating with multiple base stations simultaneously during soft handoff. Soft handoff is the process of establishing a link with a new base station before breaking the link with the previous base station. Soft handoff minimizes the probability of dropped calls. The method and system for providing a communication with a subscriber station through more than one base station during the soft handoff process are disclosed in U.S. Pat. No. 5,267,261, entitled "MOBILE ASSISTED SOFT HANDOFF IN A CDMA CELLULAR TELEPHONE SYSTEM," assigned to the assignee of the present invention and incorporated by reference herein. Softer handoff is the process whereby the communication occurs over multiple sectors which are serviced by the same base station. The process of softer handoff is described in detail in U.S. Pat. No. 5,933,787, entitled "METHOD AND APPARATUS FOR PERFORMING HANDOFF BETWEEN SECTORS OF A COMMON BASE STATION," issued Aug. 3, 1999, assigned to the assignee of the present invention and incorporated by reference herein A significant difference between voice services and data services is the fact that the former imposes stringent and fixed delay requirements. Typically, the overall one-way delay of speech frames must be less than 100 msec. In contrast, the data delay can become a variable parameter used to optimize the efficiency of the data communication system. Specifically, more efficient error correcting coding techniques which require significantly larger delays than those that can be tolerated by voice services can be utilized. An exemplary efficient coding scheme for data is disclosed in U.S. Pat. No. 5,933,462, entitled "SOFT DECISION OUTPUT DECODER FOR DECODING CONVOLUTIONALLY ENCODED CODEWORDS," issued Aug. 3, 1999, assigned to the assignee of the present invention and incorporated by reference herein.

Another significant difference between voice services and data services is that the former requires a fixed and common grade of service (GOS) for all users. Typically, for digital systems providing voice services, this translates into a fixed and equal transmission rate for all users and a maximum tolerable value for the error rates of the speech frames. In contrast, for data services, the GOS can be different from user to user and can be a parameter optimized to increase the overall efficiency of the data communication system. The GOS of a data communication system is typically defined as the total delay incurred in the transfer of a predetermined amount of data, hereinafter referred to as a data packet.

Yet another significant difference between voice services and data services is that the former requires a reliable communication link which, in the exemplary CDMA communication system, is provided by soft handoff. Soft handoff results in redundant transmissions from two or more base stations to improve reliability. However, this additional reliability is not required for data transmission because the data packets received in error can be retransmitted. For data services, the transmit power used to support soft handoff can be more efficiently used for transmitting additional data.

The parameters which measure the quality and effectiveness of a data communication system are the transmission delay required to transfer a data packet and the average throughput rate of the system. Transmission delay does not have the same impact in data communication as it does for voice communication, but it is an important metric for measuring the quality of the data communication system. The average throughput rate is a measure of the efficiency of the data transmission capability of the communication system.

It is well known that in cellular systems the signal-to-noise-and-interference ratio C/I of any given user is a function of the location of the user within the coverage area. In order to maintain a given level of service, TDMA and FDMA systems resort to frequency reuse techniques, i.e., not all frequency channels and/or time slots are used in each base station. In a CDMA system, the same frequency allocation is reused in every cell of the system, thereby improving the overall efficiency. The C/I that any given user's subscriber station achieves determines the information rate that can be supported for this particular link from the base station to the user's subscriber station. Given the specific modulation and error correction method used for the transmission, which the present invention seek to optimize for data transmissions, a given level of performance is achieved at a corresponding level of C/I. For an idealized cellular system with hexagonal cell layouts and utilizing a common frequency in every cell, the distribution of C/I achieved within the idealized cells can be calculated.

The C/I achieved by any given user is a function of the path loss, which for terrestrial cellular systems increases as $r^3$ to $r^5$, where r is the distance to the radiating source. Furthermore, the path loss is subject to random variations due to man-made or natural obstructions within the path of the radio wave. These random variations are typically modeled as a log normal shadowing random process with a standard deviation of 8 dB.

The obtained C/I distribution can only be achieved if, at any instant in time and at any location, the subscriber station is served by the best base station which is defined as that achieving the largest C/I value, regardless of the physical distance to each base station. Because of the random nature of the path loss as described above, the signal with the largest C/I is not always transmitted by the base station closest to the subscriber station. In contrast, if a subscriber station was to communicate only via the base station of minimum distance, the C/I can be substantially degraded. It is therefore beneficial for subscriber stations to communicate to and from the best serving base station at all times, thereby achieving the optimum C/I value. It can also be observed that the range of values of the achieved C/I, in the above idealized model, is such that the difference between the highest and lowest value can be as large as 10,000. In practical implementation the range is typically limited to approximately 1:100 or 20 dB. It is therefore possible for a CDMA base station to serve subscriber stations with information bit rates that can vary by as much as a factor of 100, since the following relationship holds:

$$R_b = W \frac{(C/I)}{(E_b/I_o)}, \quad (1)$$

where $R_b$ represents the information rate to a particular subscriber station, W is the total bandwidth occupied by the spread spectrum signal, and $E_b/I_o$ is the energy per bit over interference density required to achieve a given level of performance. For instance, if the spread spectrum signal occupies a bandwidth W of 1.2288 MHz and reliable communication requires an average $E_b/I_o$ equal to 3 dB, then a subscriber station which achieves a C/I value of 3 dB to the best base station can communicate at a data rate as high as 1.2288 Mbps. On the other hand, if a subscriber station is subject to substantial interference from adjacent base stations and can only achieve a C/I of −7 dB, reliable communication can not be supported at a rate greater than 122.88 Kbps. A communication system designed to optimize the average throughput will therefore attempt to serve each remote user from the best serving base station and at the highest data rate $R_b$ which the remote user can reliably support. The data communication system of the present invention exploits the characteristic cited above and optimizes the data throughput from the CDMA base stations to the subscriber stations.

SUMMARY OF THE INVENTION

The present invention resides in a communication system, apparatus, and method for performing handoff in a wireless communication system, which takes into account the ability of a base station to receive the reverse link transmissions from the subscriber station.

The subscriber station receives the pilot signal and reverse link power control commands from all of the base stations in its Active Set. The subscriber station uses the received pilot signal for coherent demodulation of the forward link traffic signal and for determining the strength of the signal from each base station. In the exemplary embodiment, the power control commands from each base station direct the subscriber station to increase or decrease its transmission energy by predetermined amounts. In the exemplary embodiment, the subscriber station only increases its transmission energy when all base stations in the Active Set request the subscriber station to increase its transmission energy.

In the exemplary embodiment of the communication system described in the aforementioned U.S. Pat. No. 6,574,211, the high speed forward link traffic data is transmitted from only one base station. That is to say, the forward link traffic is not provided in soft handoff. This is a desirable constraint from the perspective of overall system capacity, because the redundant transmission required for soft handoff greatly impairs overall system capacity. In the exemplary embodiment, the subscriber station measures the signal energy of signals received from each of the base stations in the Active Set of the subscriber station and sends a data request control (DRC) signal indicating which base station is transmitting the strongest received signal. In addition, the DRC signal indicates a data rate which the subscriber station selects based on strength of the received signal from the selected base station.

In the exemplary embodiment of the present invention, the subscriber station stores an indication of the mix of power control commands transmitted by each base station. That is, for each base station an indicator respecting relative number of commands requesting an increase in transmission energy versus the number of power control commands requesting a decrease in transmission energy is stored. This statistic can be generated by a filtering of the power control commands from each base station. For example, an infinite impulse response filter can be used to perform an averaging of the commands. The implementation of averaging filters is well known in the art.

In an alternative embodiment, the subscriber station stores the power control commands from each base station. In a second alternative embodiment, the subscriber station stores an indication of the number of consecutive or nearly consecutive requests to increase transmission energy from each base station. A series of requests to increase transmission energy indicates that the base station is not receiving the reverse link signal.

The subscriber station makes an initial selection of the base station to transmit forward link data to it. In the exemplary embodiment, the subscriber station measures the energy of a time multiplexed pilot signal from each base station and selects the base station with the highest chip energy to interference (C/I) when including all multipath components from each base station. In the exemplary embodiment, the subscriber station includes a RAKE receiver that separately demodulates the multipath components of signals from each base station. An exemplary embodiment of a RAKE receiver is described in U.S. Pat. No. 5,103,390.

The subscriber station determines whether the selected base station requires a handoff. That is to say, whether the selected base station is the same as the base station selected to transmit in the last frame interval.

If the selected base station does require a handoff, then the subscriber uses the method of the present invention to determine if the selected base station is receiving its reverse link transmissions. In the exemplary embodiment, the subscriber station makes this determination by looking at the history of reverse link power control commands transmitted by the selected base station. A sufficient number of power control commands by a given base station requesting the subscriber station to decrease its transmission energy indicates that the reverse link signal is being received by the base station with sufficient energy. It will be understood that other methods of performing this analysis are equally applicable, for example the base stations could intermittently transmit a message indicating the average quality of the received reverse link signal.

If the subscriber station determines that its reverse link signal is being received with sufficient energy by the selected base station, then the handoff is permitted. The subscriber station transmits a message indicative of the selected base station and the rate (or change in transmission power) requested to transmit to the subscriber station.

If the subscriber station determines that its reverse link signal is not being received with sufficient energy by the selected base station, then the handoff is inhibited. In the exemplary embodiment, the subscriber station selects an alternative base station for transmission of forward link traffic data which is receiving its reverse link transmissions with sufficient energy. The subscriber station transmits a message indicative of the alternative base station and the rate requested to transmit to the subscriber station. The rate requested is based on the strength of the received pilot signal from the alternative base station.

If a handoff is not necessary, then the subscriber station again determines whether the selected base station (which is the base station selected to transmit to the subscriber station in the last frame) is reliably receiving its reverse link signal. If the subscriber station determines that its reverse link signal is being received by the selected base station with sufficient energy, then the subscriber station transmits a message indicative of the selected base station and the rate requested to transmit to the subscriber station.

If the subscriber station determines that its reverse link signal is not being received with sufficient energy by the selected base station, then a handoff is forced. The subscriber station selects an alternative base station for transmission of forward link traffic data, which is receiving its reverse link transmissions with sufficient energy. The subscriber station transmits a message indicative of the alternative base station and the rate requested to transmit to the subscriber station. The rate or power requested is based on the strength of the received pilot signal from the alternative base station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 4A and 4B are diagrams illustrating an exemplary embodiment of a frame structure and slot structure.

DETAILED DESCRIPTION OF THE PREFERRED EMBODIMENTS

Overview

Figure 1:
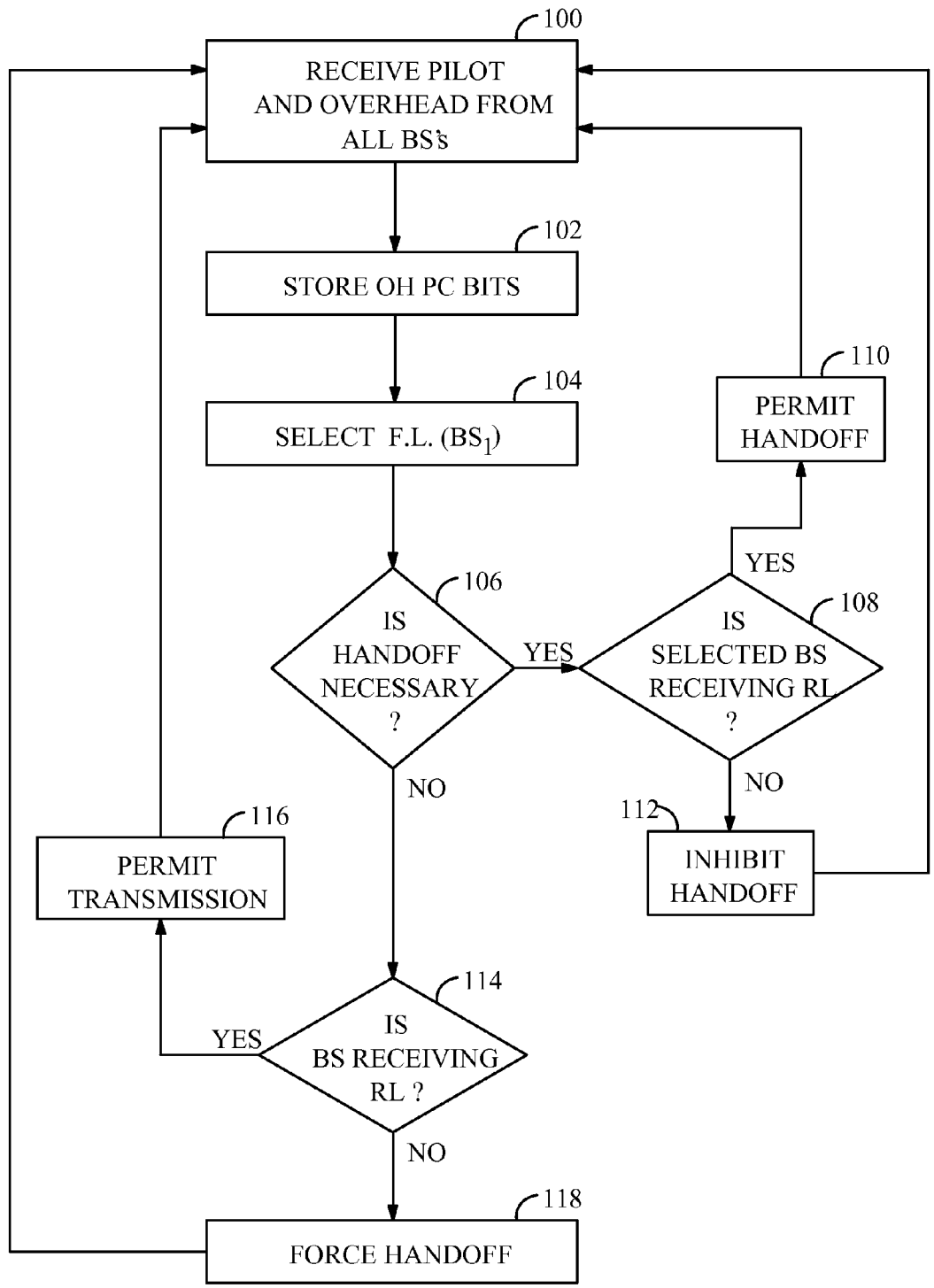
FIG. 1 is a flowchart illustrating an exemplary method of performing a handoff.

Referring to FIG. 1, in block 100, the subscriber station receives the pilot signal and reverse link power control commands from all of the base stations in its Active Set. The subscriber station uses the received pilot signal for coherent demodulation of the forward link traffic signal and for determining the strength of the signal from each base station. In the exemplary embodiment, the power control commands from each base station direct the subscriber station to increase or decrease its transmission energy. In the exemplary embodiment, the subscriber station only increases its transmission energy if no base stations in the Active Set request the subscriber station to decrease its transmission energy.

In the exemplary embodiment of the communication system described in the aforementioned U.S. Pat. No. 6,574,211, the high speed traffic data is transmitted from only one base station. That is to say, the forward link traffic is not provided in soft handoff. This is a desirable constraint from the perspective of overall system capacity. In the exemplary, the subscriber station measure the signal energy of signals from each of the base stations in the Active Set of the subscriber station and sends a data request control (DRC) signal indicating which base station is transmitting the strongest received signal. In addition, the DRC signal indicates a data rate which the subscriber station selects based on strength of the received signal from the selected base station.

In block 102, the subscriber station stores the reverse link power control commands from each base station in memory. In an alternative embodiment, the subscriber station stores a statistic indicative of the power control commands received from each base station, such as the fraction of commands received that requested a decrease in transmission energy in a predetermined number of preceding frames or the number of discrepancies between the base station's request and the response taken by the subscriber station.

In block 104, the subscriber station makes an initial selection of the base station to transmit forward link data to it. In the exemplary embodiment, the subscriber station measures the energy of a time multiplexed pilot signal from each base station and selects the base station with the highest chip energy to interference (C/I) when including all multipath components. In the exemplary embodiment, the subscriber station includes a RAKE receiver that separately demodulates the multipath components of signals from each base station. An exemplary embodiment of a RAKE receiver is described in U.S. Pat. No. 5,103,390.

In block 106, the subscriber station determines whether the selected base station requires a handoff. That is to say, whether the selected base station is the same as the base station selected to transmit in the last frame interval.

If the selected base station does require a handoff, then the process moves to block 108. In block, 108, the subscriber determines if the selected base station is receiving its reverse link transmissions. In the exemplary embodiment, the subscriber station makes this determination by looking at the history of reverse link power control commands transmitted by the selected base station. A sufficient number of power control commands requesting the subscriber station to decrease its transmission energy is indicative that the signal strength of its reverse link transmissions are being received by the selected base station. It will be understood that other methods of performing this analysis are equally applicable, for example the base stations could intermittently transmit a message indicating the average quality of the received reverse link signal. Furthermore, the busy tones, as described below, can be used to determine the quality of the reverse link.

If the subscriber station determines that its reverse link signal is being reliably received by the selected base station, then the process moves to block 110. In block 110, the handoff is permitted. The subscriber station transmits a data rate control (DRC) message indicative of the selected base station and the rate requested to transmit to the subscriber station.

If the subscriber station determines that its reverse link signal is not being reliably received by the selected base station, then the process moves to block 112. In block 112, the handoff is inhibited. In the exemplary embodiment, the subscriber station selects an alternative base station for transmission of forward link traffic data which is reliably receiving its reverse link transmissions. The subscriber station transmits a DRC message indicative of the alternative base station and the rate requested to transmit to the subscriber station. The rate requested is based on the strength of the received pilot signal from the alternative base station.

Back in block 106, if a handoff is not necessary, then the process moves to block 114. In block 114, the subscriber station again determines whether the selected base station (which is the base station previously selected) is receiving its reverse link signal with sufficient energy. The determination as to whether the base station is reliably receiving the reverse link signal proceeds as described with respect to block 108 above.

If the subscriber station determines that its reverse link signal is being received with sufficient energy by the selected base station, then the process moves to block 116. In block 116, the subscriber station transmits a message indicative of the selected base station and the rate requested to transmit to the subscriber station.

If the subscriber station determines that its reverse link signal is not being reliably received by the selected base station, then the process moves to block 118. In block 118, a handoff is forced. The subscriber station selects an alternative base station for transmission of forward link traffic data, which is receiving its reverse link transmissions with sufficient energy. The subscriber station transmits a DRC message indicative of the alternative base station and the rate requested to transmit to the subscriber station. The rate requested is based on the strength of the received pilot signal from the alternative base station.

Network Description

Figure 2:
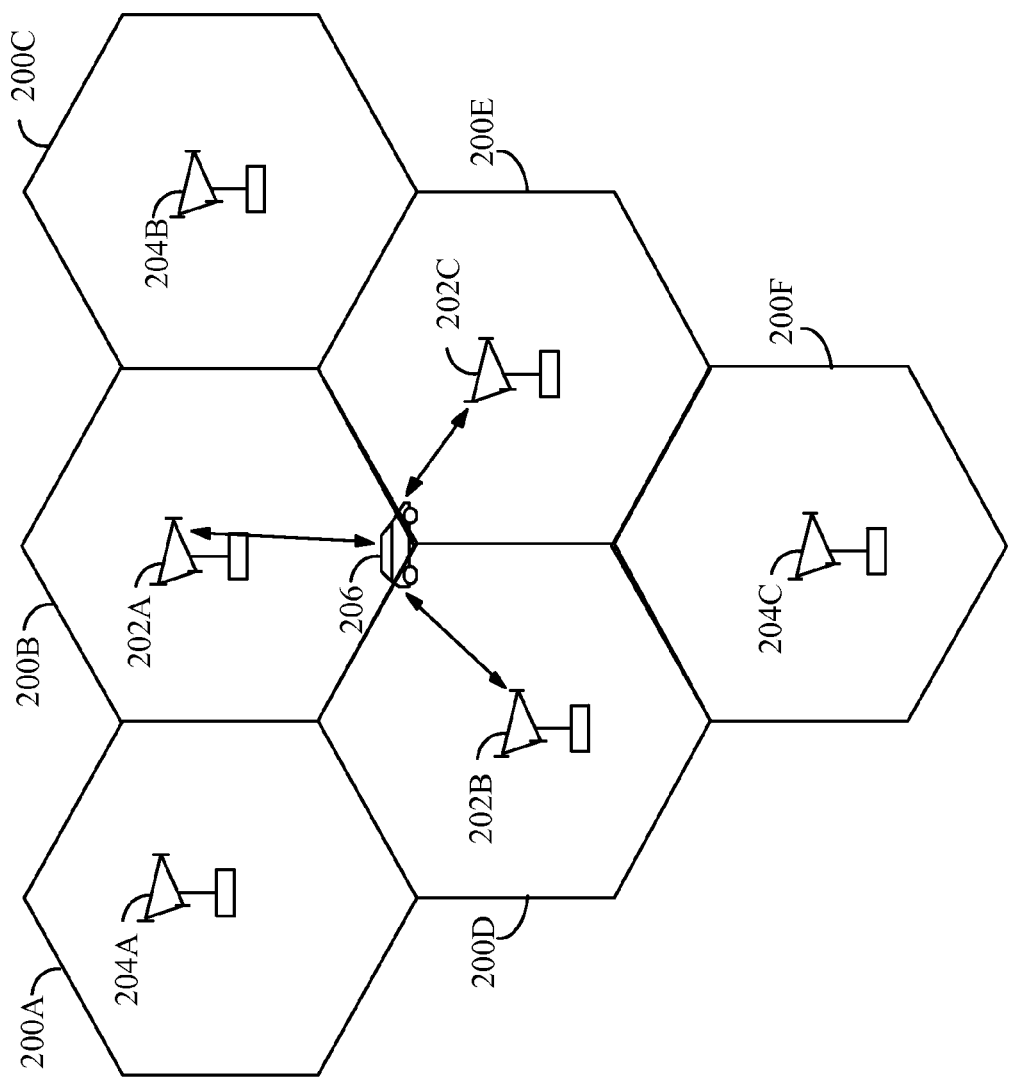
FIG. 2 is a basic diagram illustrating an exemplary embodiment of a communication system.

Referring to the figures, FIG. 2 represents an exemplary embodiment of a data communication system comprising multiple cells 200A-200F. Each cell 200 is serviced by a corresponding base station 202 or base station 204. Base stations 202 are base stations that are in active communication with subscriber station 206 and are said to make up the active set of subscriber station 206. Base stations 204 are not in communication with subscriber station 206 but have signals with sufficient strength to be monitored by subscriber station 206 for addition to the active set if the strength of the received signals increases due to a change in the propagation path characteristics. Base stations 204 are said to make up the candidate set of subscriber station 206.

In the exemplary embodiment, subscriber station 206 receives information from at most one base station 202 on the forward link at each time slot, but can be in communication with one or more base stations 202 on the reverse link, depending on whether the subscriber station 206 is in soft handoff. As shown by FIG. 1, each base station 202 preferably transmits data to one subscriber station 206 at any given moment. Subscriber stations 206, especially those located near a cell boundary, can receive the pilot signals from multiple base stations 204 in the candidate set. If the pilot signal is above a predetermined threshold, subscriber station 206 can request that base station 204 be added to the active set of subscriber station 206. In the exemplary embodiment, subscriber station 206 can receive data transmission from zero or one member of the active set.

Forward Link Structure

Figure 3A:
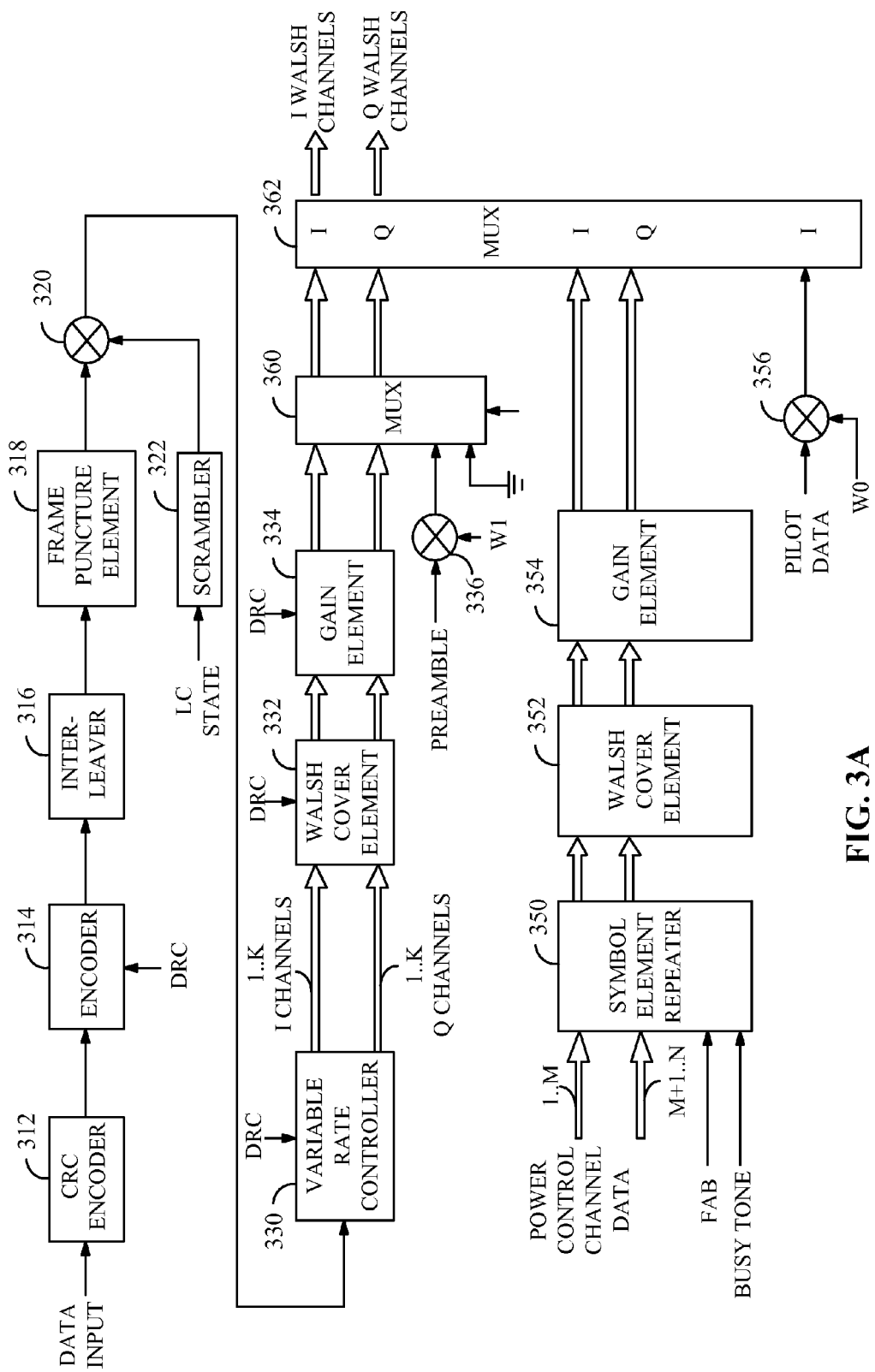
FIGS. 3A and 3B is a block diagram illustrating an exemplary embodiment of a base station.
Figure 3B:
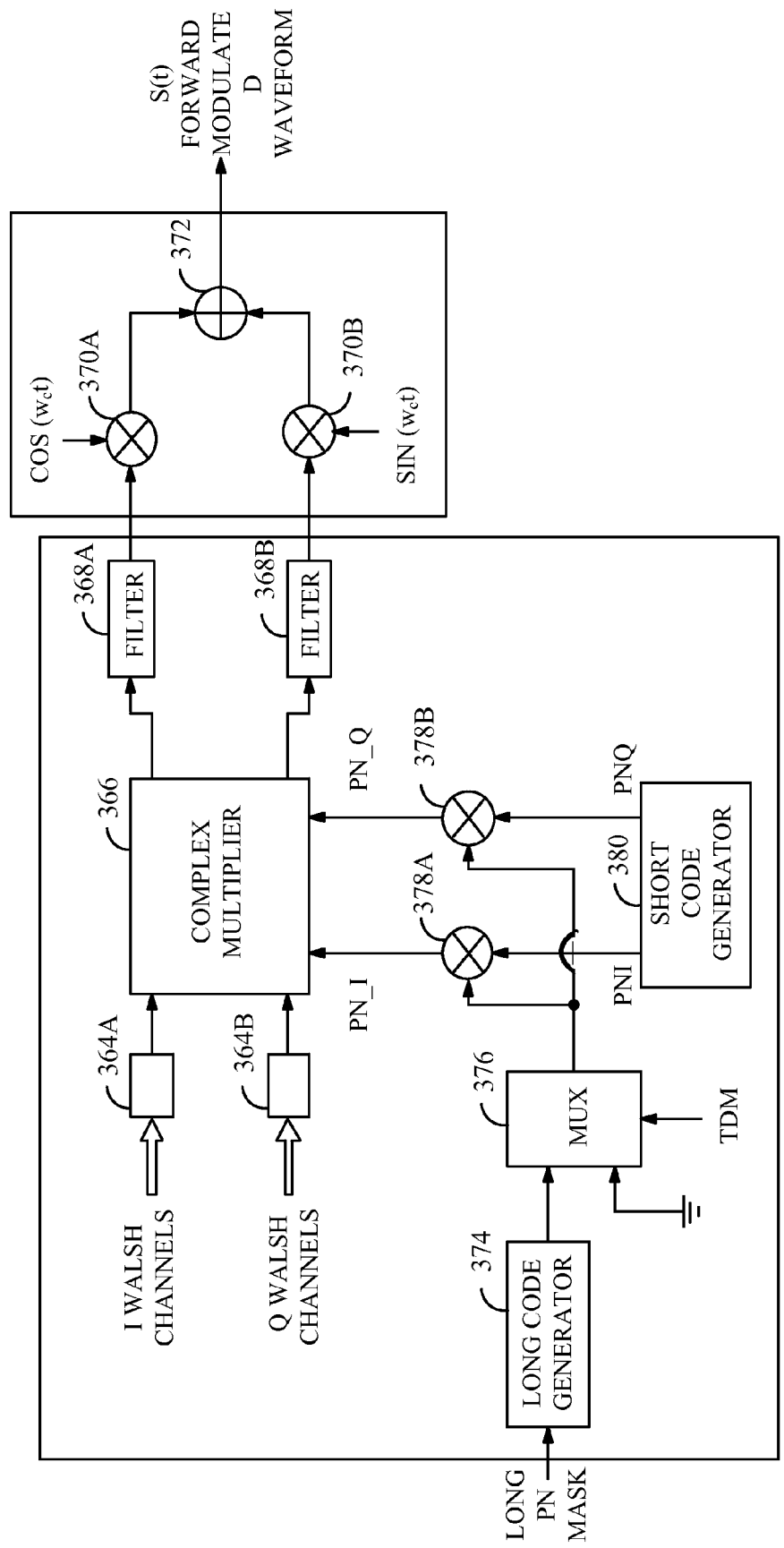

A block diagram of an exemplary embodiment of a base station is shown in FIGS. 3A and 3B. The data is partitioned into data packets and provided to CRC encoder 312. For each data packet, CRC encoder 312 generates frame check bits (e.g., the CRC parity bits) and inserts the code tail bits. The formatted packet from CRC encoder 312 comprises the data, the frame check and code tail bits, and other overhead bits which are described below. The formatted packet is provided to encoder 314 which, in the exemplary embodiment, encodes the data in accordance with a convolutional or turbo encoding format. The encoded packet from encoder 314 is provided to interleaver 316 which reorders the code symbols in the packet. The interleaved packet is provided to frame puncture element 318 which removes a fraction of the packet in the manner described below. The punctured packet is provided to multiplier 320 which scrambles the data with the scrambling sequence from scrambler 322. The output from multiplier 320 comprises the scrambled packet. The scrambled packet is provided to variable rate controller 330 which demultiplexes the packet into K parallel in-phase and quadrature-phase channels, where K is dependent on the data rate. In the exemplary embodiment, the scrambled packet is first demultiplexed into the in-phase (I) and quadrature-phase (Q) streams. In the exemplary embodiment, the I stream comprises even indexed symbols and the Q stream comprises odd indexed symbol.

Each stream is further demultiplexed into K parallel channels such that the symbol rate of each channel is fixed for all data rates. The K channels of each stream are provided to Walsh cover element 332 which covers each channel with a Walsh function to provide orthogonal channels. The orthogonal channel data is provided to gain element 334 which scales the data to maintain a constant total-energy-per-chip (and hence constant output power) for all data rates. The scaled data from gain element 334 is provided to multiplexer (MUX) 360 which multiplexes the data with a preamble sequence. The output from MUX 360 is provided to multiplexer (MUX) 362 which multiplexes the traffic data, the power control bits, and the pilot data. The output of MUX 362 comprises the I Walsh channels and the Q Walsh channels.

The reverse link power control (RPC) bits are provided to symbol repeater 350 which repeats each RPC bit a predetermined number of times. The repeated RPC bits are provided to Walsh cover element 352 which covers the bits with the Walsh covers corresponding to the RPC indices. The covered bits are provided to gain element 354 which scales the bits prior to modulation so as to maintain a constant total transmit power.

In addition, a forward activity bit is provided to symbol repeater 350. The forward activity bit alerts subscriber station 206 to a forthcoming blank frame in which the base station will not transmit forward link data. This transmission is made in order to allow subscriber station 206 to make a better estimate of the C/I of the signal from base stations 202. The repeated versions of the forward activity bit are Walsh covered in Walsh cover element 352 so as to be orthogonal to the Walsh covered power control bits. The covered bits are provided to gain element 354 which scales the bits prior to modulation so as to maintain a constant total transmit power.

In addition, a busy tone is provided to symbol repeater 350. The busy tone alerts subscriber station 206 to a reverse link loading condition. In an exemplary embodiment, the busy tone is a single bit indicative of the reverse link being fully loaded or having capacity. In the preferred embodiment, the busy tone is a two bit signal indicative of a request by base stations 202 for subscriber stations 206 in its coverage area to either deterministically increase or decrease the rate of their reverse link transmissions, or to stochastically increase or decrease the rate of their reverse link transmissions. The repeated versions of the busy tone is Walsh covered in Walsh cover element 352 so as to be orthogonal to the Walsh covered power control bits and forward activity bit. The covered bit is provided to gain element 354 which scales the bits prior to modulation so as to maintain a constant total transmit power.

The pilot data comprises a sequence of all zeros (or all ones) which is provided to multiplier 356. Multiplier 356 covers the pilot data with Walsh code $W_0$. Since Walsh code $W_0$ is a sequence of all zeros, the output of multiplier 356 is the pilot data. The pilot data is time multiplexed by MUX 362 and provided to the I Walsh channel which is spread by the short $PN_I$ code within complex multiplier 366 (see FIG. 3B). In the exemplary embodiment, the pilot data is not spread with the long PN code, which is gated off during the pilot burst by MUX 376, to allow reception by all subscriber stations 206. The pilot signal is thus an unmodulated BPSK signal.

A block diagram of the exemplary modulator used to modulate the data is illustrated in FIG. 3B. The I Walsh channels and Q Walsh channels are provided to summers 364A and 364B, respectively, which sum the K Walsh channels to provide the signals $I_{sum}$ and $Q_{sum}$, respectively. The $I_{sum}$ and $Q_{sum}$ signals are provided to complex multiplier 366. Complex multiplier 366 also receives the PN_I and PN_Q signals from multipliers 378A and 378B, respectively, and multiplies the two complex inputs in accordance with the following equation:

$$(I_{mult} + jQ_{mult}) = (I_{sum} + jQ_{sum}) \cdot (PN\_I + jPN\_Q) \quad (2)$$
$$= (I_{sum} \cdot PN\_I - Q_{sum} \cdot PN\_Q) +$$
$$j(I_{sum} \cdot PN\_Q + Q_{sum} \cdot PN\_I),$$

where $I_{mult}$ and $Q_{mult}$ are the outputs from complex multiplier 366 and j is the complex representation. The $I_{mult}$ and $Q_{mult}$ signals are provided to filters 368A and 368B, respectively, which filter the signals. The filtered signals from filters 368A and 368B are provided to multipliers 370A and 370B, respectively, which multiply the signals with the in-phase sinusoid $COS(w_c t)$ and the quadrature-phase sinusoid $SIN(w_c t)$, respectively. The I modulated and Q modulated signals are provided to summer 372 which sums the signals to provide the forward modulated waveform S(t).

In the exemplary embodiment, the data packet is spread with the long PN code and the short PN codes. The long PN code scrambles the packet such that only the subscriber station 206 for which the packet is destined is able to descramble the packet. In the exemplary embodiment, the pilot and power control bits and the control channel packet are spread with the short PN codes but not the long PN code to allow all subscriber stations 206 to receive these bits. The long PN sequence is generated by long code generator 374 and provided to multiplexer (MUX) 376. The long PN mask determines the offset of the long PN sequence and is uniquely assigned to the destination subscriber station 206. The output from MUX 376 is the long PN sequence during the data portion of the transmission and zero otherwise (e.g. during the pilot and power control portion). The gated long PN sequence from MUX 376 and the short $PN_I$ and $PN_Q$ sequences from short code generator 380 are provided to multipliers 378A and 378B, respectively, which multiply the two sets of sequences to form the PN_I and PN_Q signals, respectively. The PN_I and PN_Q signals are provided to complex multiplier 366.

The block diagram of the exemplary embodiment of the base station shown in FIGS. 3A and 3B is one of numerous architectures which support data encoding and modulation on the forward link. Other architectures, such as the architecture for the forward link traffic channel in the CDMA system which conforms to the IS-95 standard, can also be utilized and are within the scope of the present invention.

Forward Link Frame Structure

A diagram of an exemplary embodiment of a forward link frame structure is illustrated in FIG. 4A. The traffic channel transmission is partitioned into frames which, in the exemplary embodiment, are defined as the length of the short PN sequences or 26.67 msec. Each frame can carry control channel information addressed to all subscriber stations 206 (control channel frame), traffic data addressed to a particular subscriber station 206 (traffic frame), or can be empty (idle frame). The content of each frame is determined by the scheduling performed by the transmitting base station 202. In the exemplary embodiment, each frame comprises 16 time slots, with each time slot having a duration of 1.667 msec. A time slot of 1.667 msec is adequate to enable subscriber station 206 to perform the C/I measurement of the forward link signal. A time slot of 1.667 msec also represents a sufficient amount of time for efficient packet data transmission.

In the exemplary embodiment, each forward link data packet comprises 1024 or 2048 bits. Thus, the number of time slots required to transmit each data packet is dependent on the data rate and ranges from 16 time slots for the 38.4 Kbps rate to 1 time slot for the 1.2288 Mbps rate and higher.

An exemplary diagram of the forward link slot structure is shown in FIG. 4B. In the exemplary embodiment, each slot comprises three of the four time multiplexed channels, the traffic channel, the control channel, the pilot channel, and the overhead control channel. In the exemplary embodiment, the pilot signal is transmitted in two bursts and the overhead control channel is transmitted on either side of the second pilot burst. The traffic data is carried in three portions of the slot (402A, 402B and 402C).

The first pilot burst 406A is time multiplexed into the first half of the slot by multiplexer 362. The second pilot burst 406B is time multiplexed into the second half of the slot. One either side of second pilot burst 406B overhead channel data 408 including the forward activity bit, the busy tones and the power control bits are multiplexed into the slot.

Subscriber Station

Figure 5:
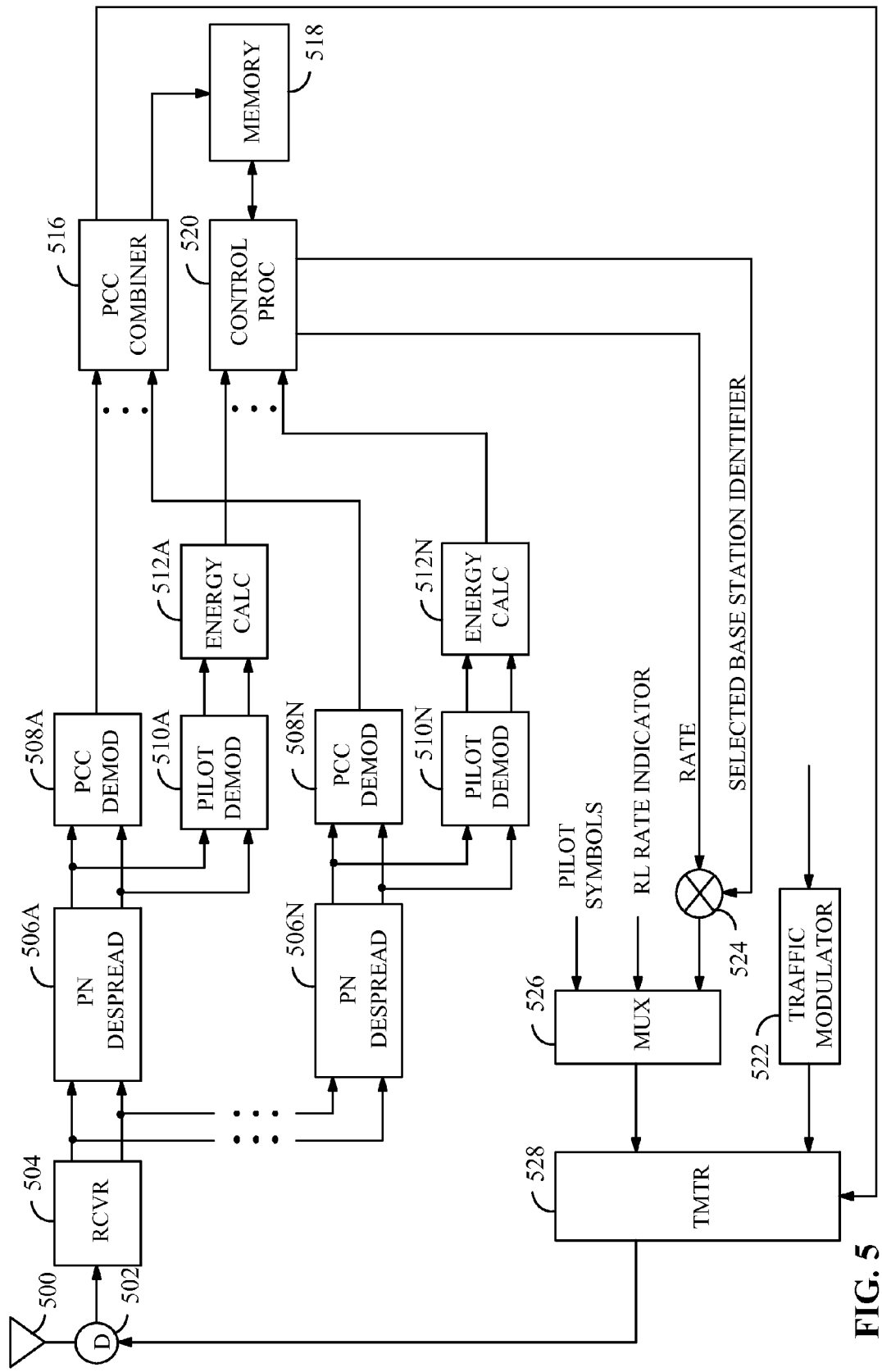
FIG. 5 is a block diagram illustrating an exemplary embodiment of a subscriber station.

FIG. 5 illustrates an exemplary embodiment of the subscriber station 206. Forward link signals are received at antenna 500 and provided through duplexer 502 to receiver 504. In the exemplary embodiment, receiver 504 is a quaternary phase shift keying (QPSK) receiver. It will be understood by one skilled in the art that the present invention is equally applicable to any other modulation format such as BPSK or QAM.

The in-phase and quadrature-phase components of the received signal are provided to PN despreaders 506. In the exemplary embodiment, multiple PN despreaders 506A-506N are provided. Each of despreaders 506 is capable of demodulating a signal from a different base station in the Active set of subscriber station 206 or a different multipath component of the signal from a base station.

The PN despread signal is provided to power control command (PCC) demodulator 508. In the exemplary embodiment, PCC demodulator 508 performs an FHT on the received power control symbols and determines whether the base station is requesting subscriber station 206 to increase or decrease its transmission energy.

The demodulated power control symbols are provided to power control command combiner 516. In the exemplary embodiment, power control command combiner 516 soft combines multipath components of the power control command symbols from a single base station and generates a hard estimate of the power control command from each base station. The hard estimate from each of the base stations is stored in memory 518. In an alternative embodiment, a statistic representing the recent history of power control commands from each base station is stored in memory 518.

Then, power control command combiner 516 performs an OR-of-the-downs operation in which the transmission energy of subscriber station 206 is only increased if all the power control commands indicate a need to increase the transmission energy. Power control command combiner 516 provides a control signal to transmitter (TMTR) 528 increasing or decreasing its amplification of the reverse link signal from subscriber station 206.

The PN despread signals from PN despreaders 506 are also provided to pilot demodulators 510. Pilot demodulators 510 despread the pilot signal. In the exemplary embodiment, the Walsh 0 function is used to spread the pilot signal, and as such pilot demodulators 510 are implemented as accumulators. The despread pilot signals are provided to energy calculators 512. Energy calculators 512 compute the energy of the demodulated pilot bursts. In the exemplary embodiment, this operation is performed by summing the squares of the demodulated symbol amplitudes. The calculated energy values are provided to control processor 520.

Control processor 520 sums the energies from multipath components of a common base station and generates and chip energy to interference ratio for each base station. Control processor 520 then selects the base station with the highest (C/I) and selects a requested rate for that base station. After the base station is selected, the operation described in blocks 106-118 of FIG. 1 is performed by control processor 520.

After performing the selection process described with respect to FIG. 1, a signal indicative of the selected base station and a symbol indicative of the requested rate are provided to spreading element 524. In the exemplary embodiment, the rate request is spread by the signal indicative of the selected base station. This signal is multiplexed with other overhead data such as a reverse rate indicator (RRI) and the pilot symbols. In the exemplary embodiment, this data is provided on the in-phase component of a transmitted QPSK signal. The reverse link traffic data is modulated and provided for transmission on the quadrature phase component of the transmitted QPSK signal.

Transmitter 528 upconverts, amplifies, and filters the signal for transmission. In the exemplary embodiment, transmitter 528 also spreads the reverse link signal in accordance with a pseudonoise sequence. The signal is provided through duplexer 502 for transmission through antenna 500.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

The invention claimed is:

1. A subscriber station, comprising:
   means for selecting a base station for transmission of forward link data;
   means for determining whether a reverse link signal is being reliably received by the base station;
   means for selecting an alternative base station for the transmission of the forward link data if the reverse link signal is not being reliably received by the base station; and
   means for sending a message indicating the alternative base station for handoff and a requested transmission data rate for the alternative base station if the reverse link signal is not being reliably received by the base station.

2. The subscriber station of claim 1, wherein the means for determining whether the reverse link signal is being reliably received by the base station comprises means for analyzing a history of reverse link power control commands transmitted by the base station.

3. The subscriber station of claim 1, wherein the means for determining whether the reverse link signal is being reliably received by the base station comprises means for intermittently receiving a message from the base station indicating an average quality of the reverse link signal received at the base station.

4. The subscriber station of claim 1, further comprising:
   means for determining that a handoff to the base station is necessary; and
   means for inhibiting the handoff to the base station if the reverse link signal is not being reliably received by the base station.

5. The subscriber station of claim 1, further comprising:
   means for determining that a handoff to the base station is not necessary; and
   means for forcing handoff to the alternative base station if the reverse link signal is not being reliably received by the base station.

6. A subscriber station, comprising:
   circuitry configured to select a base station for transmission of forward link data, to determine whether a reverse link signal is being reliably received by the base station, to select an alternative base station for the transmission of the forward link data if the reverse link signal is not being reliably received by the base station, and to send a message indicating the alternative base station for handoff and a requested transmission data rate for the alternative base station if the reverse link signal is not being reliably received by the base station.

7. The subscriber station of claim 6, wherein the circuitry configured to determine whether the reverse link signal is being reliably received by the base station comprises circuitry configured to analyze a history of reverse link power control commands transmitted by the base station.

8. The subscriber station of claim 6, wherein the circuitry configured to determine whether the reverse link signal is being reliably received by the base station comprises circuitry configured to intermittently receive a message from the base station indicating an average quality of the reverse link signal received at the base station.

9. The subscriber station of claim 6, further comprising circuitry configured to determine that a handoff to the base station is necessary, and to inhibit the handoff to the base station if the reverse link signal is not being reliably received by the base station.

10. The subscriber station of claim 6, further comprising circuitry configured to determine that a handoff to the base station is not necessary, and to force handoff to the alternative base station if the reverse link signal is not being reliably received by the base station.

11. A method for communications by a subscriber station, comprising:
    selecting a base station for transmission of forward link data;
    determining whether a reverse link signal is being reliably received by the base station;
    selecting an alternative base station for the transmission of the forward link data if the reverse link signal is not being reliably received by the base station; and
    sending a message indicating the alternative base station for handoff and a requested transmission data rate for the alternative base station if the reverse link signal is not being reliably received by the base station.

12. The method of claim 11, wherein determining whether the reverse link signal is being reliably received by the base station comprises analyzing a history of reverse link power control commands transmitted by the base station.

13. The method of claim 11, wherein determining whether the reverse link signal is being reliably received by the base station comprises intermittently receiving a message from the base station indicating an average quality of the reverse link signal received at the base station.

14. The method of claim 11, further comprising:
    determining that a handoff to the base station is necessary; and
    inhibiting the handoff to the base station if the reverse link signal is not being reliably received by the base station.

15. The method of claim 11, further comprising:
    determining that a handoff to the base station is not necessary; and
    forcing handoff to the alternative base station if the reverse link signal is not being reliably received by the base station.

16. A non-transitory computer-program product for communicating messages, the computer-program product including a computer-readable medium encoded with computer-readable instructions for:
    selecting a base station for transmission of forward link data;
    determining whether a reverse link signal is being reliably received by the base station;
    selecting an alternative base station for the transmission of the forward link data if the reverse link signal is not being reliably received by the base station; and
    sending a message indicating the alternative base station for handoff and a requested transmission data rate for the alternative base station if the reverse link signal is not being reliably received by the base station.

17. The non-transitory computer-program product for communicating messages of claim 16, wherein the instructions for determining whether the reverse link signal is being reliably received by the base station comprise instructions for analyzing a history of reverse link power control commands transmitted by the base station.

18. The non-transitory computer-program product for communicating messages of claim 16, wherein the instructions for determining whether the reverse link signal is being reliably received by the base station comprise instructions for intermittently receiving a message from the base station indicating an average quality of the reverse link signal received at the base station.

19. The non-transitory computer-program product for communicating messages of claim 16, wherein the computer-readable medium is also encoded with computer-readable instructions for determining that a handoff to the base station is necessary, and for inhibiting the handoff to the base station if the reverse link signal is not being reliably received by the base station.

20. The non-transitory computer-program product for communicating messages of claim 16, wherein the computer-readable medium is also encoded with computer-readable instructions for determining that a handoff to the base station is not necessary, and for forcing handoff to the alternative base station if the reverse link signal is not being reliably received by the base station.

* * * * *